United States Patent
Igi

(10) Patent No.: US 7,457,211 B2
(45) Date of Patent: Nov. 25, 2008

(54) DISC APPARATUS AND RECORDING METHOD THEREOF

(75) Inventor: Yasumasa Igi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 645 days.

(21) Appl. No.: 11/229,505

(22) Filed: Sep. 20, 2005

(65) Prior Publication Data

US 2006/0083133 A1     Apr. 20, 2006

(30) Foreign Application Priority Data

Oct. 14, 2004   (JP)   ............ P2004-300631

(51) Int. Cl.
*G11B 7/00* (2006.01)
(52) U.S. Cl. ............ 369/47.13; 369/47.23; 369/59.25
(58) Field of Classification Search .......... 369/47.13, 369/47.23, 47.24
See application file for complete search history.

(56) References Cited

U.S. PATENT DOCUMENTS

2003/0081525 A1 *   5/2003   Yoneyama et al. ........ 369/59.25

FOREIGN PATENT DOCUMENTS

JP        11338645 A   * 12/1999
JP        A-2003-132630   5/2003

* cited by examiner

*Primary Examiner*—Jorge L Ortiz Criado
(74) *Attorney, Agent, or Firm*—Morgan, Lewis & Bockius LLP

(57) ABSTRACT

An optical apparatus calculates, based on the information data recording time, a recording area recording information data and an area to be finalized that is expected to become an unrecorded area after the information data is recorded, and alternately repeats recording of information data into the recording area and finalization including recording of predetermined dummy data into an area to be finalized a predetermined distance away from the calculated information data recording area. Once recording of the information data is complete and the information data recording area is fixed, the apparatus records predetermined dummy data into a remaining non-finalized area of the recording medium to perform finalization.

3 Claims, 3 Drawing Sheets

DISC APPARATUS AND RECORDING METHOD THEREOF

BACKGROUND OF THE INVENTION

1. Field of the Invention

The present invention relates to a disc apparatus for recording/reproducing information data onto/from a recording medium such as a DVD (Digital Versatile Disc) and its recording method, and in particular to a disc apparatus capable of reducing the time required for finalization of a recording medium such as a DVD and its recording method.

2. Description of the Related Art

It is well-known that, in case information data has been recorded onto a recording medium requiring finalization such as a DVD, finalization is required for writing predetermined dummy data into an unrecorded area of the recording medium in order for the information data recorded on to the recording medium to be reproduced on a reproducing device. A problem with this approach arises that, once finalization is started, the recording medium cannot be taken out or other information data cannot be recorded/reproduced until the finalization is over. Further, the finalization writes predetermined dummy data into an unrecorded area of the recording medium on which information data has been recorded, so that a prolonged time from several tens of minutes to two hours is required for finalization of writing predetermined dummy data into an unrecorded area of the recording medium depending on the recording capacity of the unrecorded area of the recording medium.

As a related art, there has been disclosed a technique where simplified finalization is made to write file management information required to reproduce a recording medium into the management information area of the recording medium, and additional finalization is made, as required, to write predetermined information or data required to obtain the address information on the access position of a recording medium into the boundary area of the recording medium on which the simplified finalization has been made (for example, refer to JP-A-2003-132630).

SUMMARY OF THE INVENTION

While the technique mentioned in the related art can perform simplified finalization to write file management information required to reproduce a recording medium into the management information area of the recording medium, and perform additional finalization, as required, to write predetermined information or data required to obtain the address information on the access position of a recording medium into the boundary area of the recording medium on which the simplified finalization has been made, the technique is not one that writes file management information into the management information area of the recording medium after information data is recorded onto the recording medium in order to allow the recording medium to be taken out thus solving the above problems.

It is an object of the invention to provide a disc apparatus capable of reducing the time required for finalization after information data is recorded onto a recording medium that requires finalization.

According to an aspect of the invention, there is provided with a disc apparatus for recording/reproducing information data onto/from a recording medium that requires finalization, the disc apparatus including: a calculation unit calculating, based on an information data recording time, a recording area for recording the information data and an area to be finalized that is expected to become an unrecorded area after the information data is recorded; a storage unit temporarily storing the information data; a recording unit recording the information data stored in the information data recording area calculated by the calculation unit; a first finalizing unit recording predetermined dummy data into an area to be finalized a predetermined distance away from the recording area calculated by the calculation unit to perform the finalization; a control unit controlling recording of information data by the recording unit and recording of predetermined dummy data by the first finalizing unit; and a second finalizing unit recording the predetermined dummy data into a remaining non-finalized area of the recording medium to perform the finalization after recording of information data is over and the recording area of the information data is fixed.

According to another aspect of the invention, the control unit alternately repeats recording of the predetermined volume of information data by the recording unit and recording of the predetermined volume of the predetermined dummy data by the first finalizing unit.

These unit reduces the time required for finalization after information data is recorded onto a recording medium that requires finalization.

According to the above-aspect of the invention, a recording area for recording information data and an area to be finalized that is expected to become an unrecorded area after the information data is recorded are calculated based on the information data recording time. Recording of information data into the calculated information data recording area and finalization to record predetermined dummy data into an area to be finalized a predetermined distance away from the calculated information data recording area are alternately repeated. Once recording of the information data is over and the recording area of the information data is fixed, the predetermined dummy data is recorded into a remaining non-finalized area of the recording medium. This allows recording of information data and finalization to be executed in parallel, thus reducing the time required for finalization following recording of information data onto a recording medium that requires finalization.

According to the above-aspect of the invention, a recording area for recording information data and an area to be finalized that is expected to become an unrecorded area after the information data is recorded are calculated based on the information data recording time. Recording of information data into the calculated information data recording area and finalization to record predetermined dummy data into an area to be finalized a predetermined distance away from the calculated information data recording area are controlled. Once recording of the information data is over and the recording area of the information data is fixed, the predetermined dummy data is recorded into a remaining non-finalized area of the recording medium. This reduces the time required for finalization following recording of information data onto a recording medium that requires finalization.

According to the above-aspect of the invention, recording of the predetermined volume of information data and recording of the predetermined volume of the predetermined dummy data are alternately repeated. This allows recording of information data and finalization to be executed in parallel, thus reducing the time required for finalization following recording of information data onto a recording medium that requires finalization.

According to the above-aspect of the invention, an information data recording area for recording information data and an area to be finalized that is expected to become an unrecorded area after the information data is recorded are calculated based on the information data recording time. Recording of a predetermined volume of information data into the calculated information data recording area and recording of a predetermined volume of dummy data into an area to be finalized a predetermined distance away from the calculated information data recording area are alternately repeated. The predetermined dummy data is recorded into a remaining non-finalized area on the outer peripheral side of the information data recording area fixed with recording of information data complete in order to perform finalization. This allows recording of information data and finalization to be executed in parallel, thus reducing the time required for finalization following recording of information data onto a recording medium that requires finalization.

DESCRIPTION OF THE PREFERRED EMBODIMENTS

Figure 1:
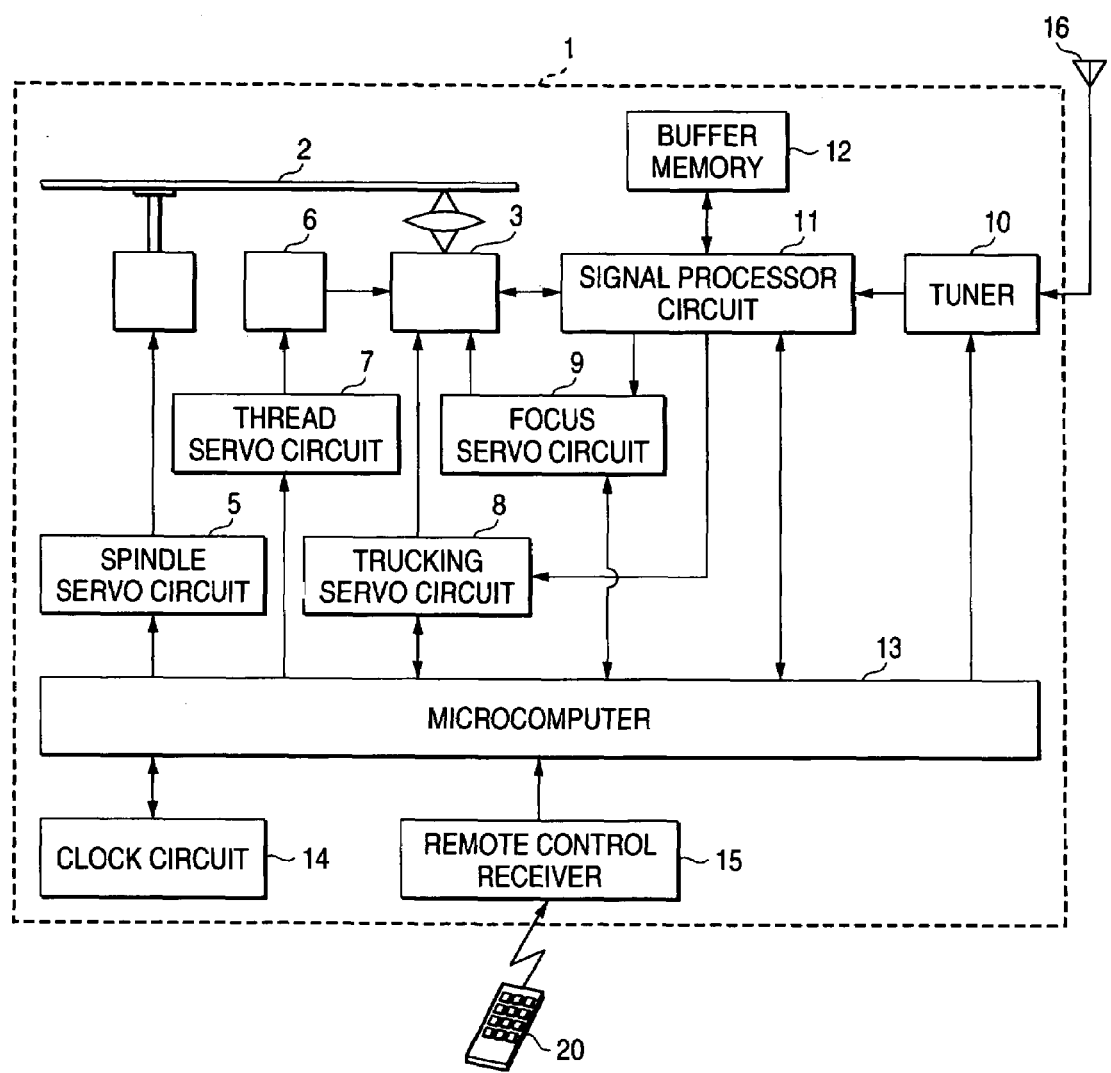
FIG. 1 is a block diagram showing a configuration of a disc apparatus according to an embodiment of the invention.
Figure 2:
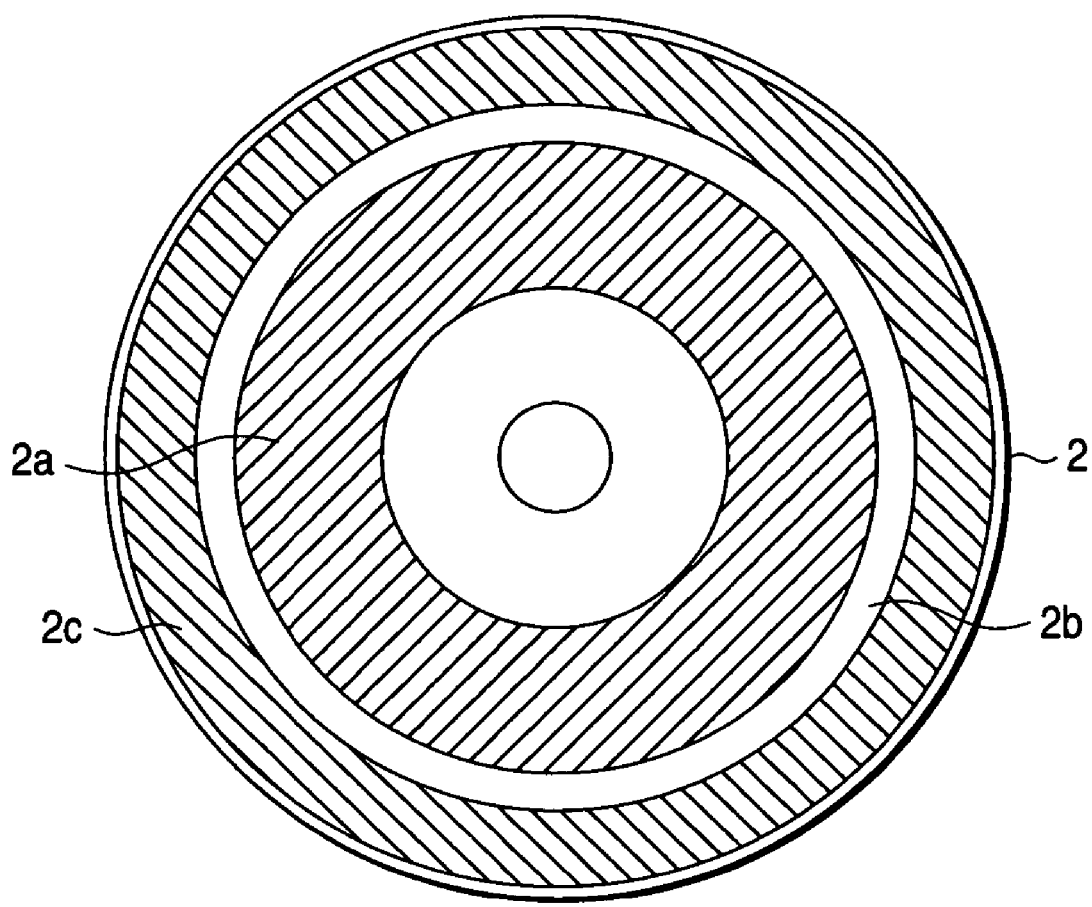
FIG. 2 is an explanatory drawing illustrating the operation of the disc apparatus according to an embodiment of the invention.
Figure 3:
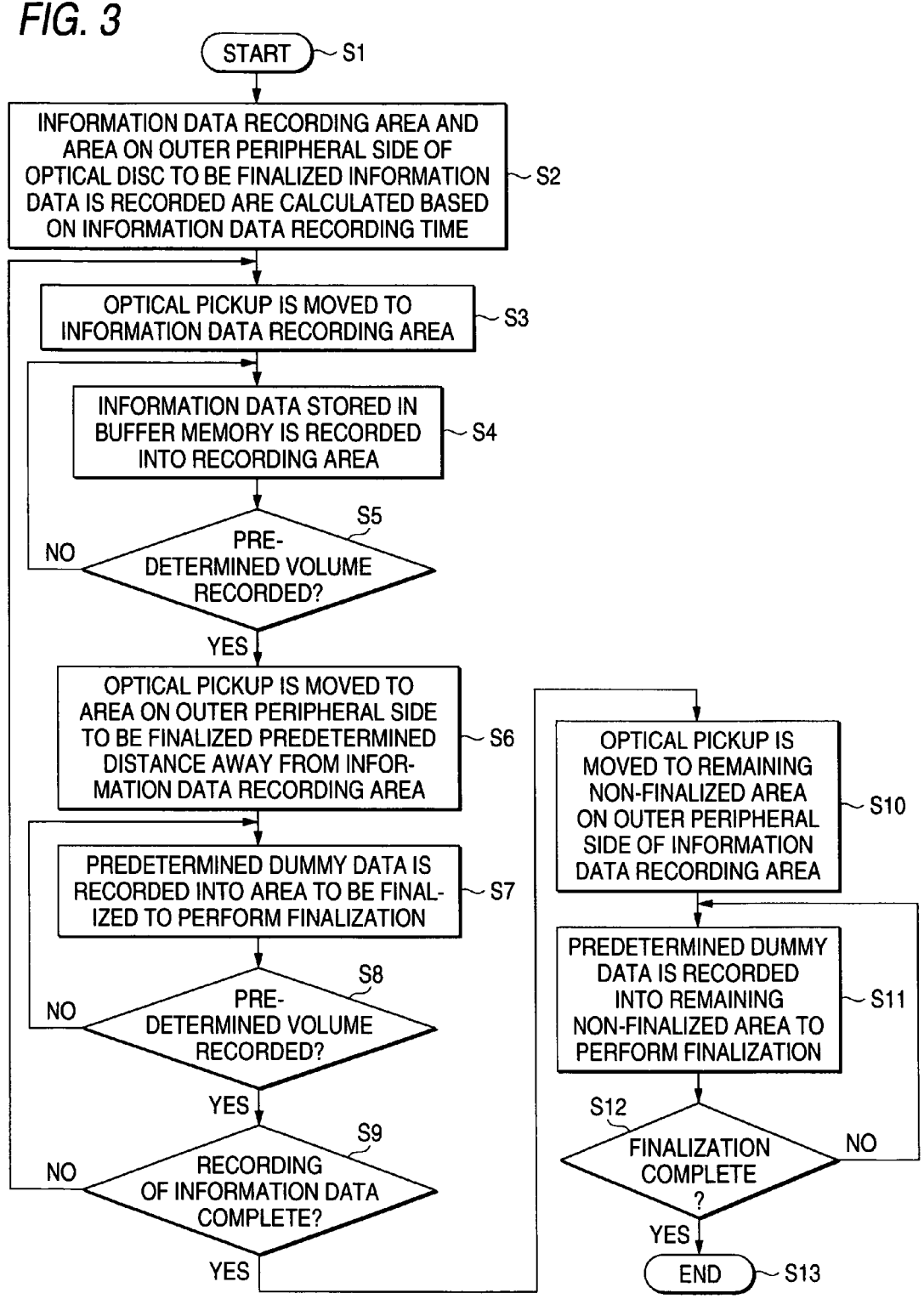
FIG. 3 is a flowchart of the operation of the disc apparatus according to an embodiment of the invention.

The embodiment of the invention will be described referring to drawings as required. FIG. 1 is a block diagram showing a configuration of a disc apparatus according to the embodiment of the invention. FIG. 2 is an explanatory drawing illustrating the operation of the disc apparatus according to the embodiment of the invention. FIG. 3 is a flowchart of the operation of the disc apparatus according to the embodiment of the invention.

A disc apparatus will be described based on the block diagram (FIG. 1) showing a configuration of a disc apparatus according to the embodiment of the invention. A disc apparatus 1 includes: an optical pickup 3 for irradiating laser light onto the recording face of an optical disc 2 to record information data onto the optical disc 2 as well as irradiating laser light onto the optical disc 2 and detect its reflected light to read the information data recorded on the optical disc 2; a spindle motor 4 for rotating the optical disc 2; a spindle servo circuit 5 for driving the spindle motor 4 to servo-control the rotation speed of the optical disc to a predetermined value; a thread motor 6 for moving the optical pickup 3 in the radial direction of the optical disc 2, a thread servo circuit 7 for servo-controlling the rotation direction and rotation speed of the thread motor 6; a tracking servo circuit 8 for servo-controlling the tracking of the optical pickup 3; a focus servo circuit for servo-controlling the focusing of the optical pickup 3 based on a focus error signal detected by the optical pickup 3; a tuner 10 for receiving a television broadcast program on a selected channel from television broadcast radio waves received by an antenna 16; a signal processor circuit 11 for detecting synchronization of and demodulating the information data read by the optical pickup 3 based on a reference clock, correcting an error in the demodulated information data, expanding and decoding the information data compressed based on a predetermined compression system to reproduce the information data as well as encoding the information data, compressing the information data based on a predetermined compression system, and driving the optical pickup 3 to record the information data onto the optical disc 2; a buffer memory 12 for temporarily storing the information data; a microcomputer 13 for controlling the entire system of the disc apparatus 1; a clock circuit 14 for managing a calendar and a time; and a remote control receiver 15 for receiving an infrared remote-control signal transmitted from a remote control device 20 and converting the received infrared remote-control signal to a predetermined electric signal.

Operation of the disc apparatus thus configured will be described referring to an explanatory drawing illustrating the operation of the disc apparatus according to the embodiment of the invention (FIG. 2).

When recording of information data whose recording time of timer-based preprogrammed recording or the like is known is instructed, the microcomputer 13 calculates a recording area 2a on the inner peripheral side of the optical disc 2 into which information data is to be recorded and areas to be finalized 2b, 2c (refer to FIG. 2) on the outer peripheral side on the optical disc 2 expected to become an unrecorded area after the information data is recorded. Then, the microcomputer 13 transmits a control signal to the spindle servo circuit 5 to rotate the spindle motor 4 in order to rotate the optical disc 2 at a predetermined rotation speed, for example a rotation speed equal to or more than the double speed, transmits a control signal to the thread servo circuit 7, drives the thread motor 6 to move the optical pickup 3 to the recording area 2a (refer to FIG. 2) on the inner peripheral side of the optical disc 2, and transmits a control signal to the signal processor circuit 11 to record the information data stored in the buffer memory 12 into the recording area 2a of the optical disc 2 by a predetermined volume, for example, a volume corresponding to 15 seconds of single-speed reproduction time, at a speed equal to or more than the double speed.

Having recorded a predetermined volume of information data stored in the buffer memory 12 into the recording area 2a of the optical disc 2, the microcomputer 13 transmits a control signal to the thread servo circuit 7, drives the thread motor 6 to move the optical pickup 3 to the recording area 2c to be finalized on the outer peripheral side of the optical disc 2 a predetermined distance away from the recording area 2a (refer to FIG. 2) of the optical disc 2, the recording area 2c expected to become an unrecorded area after the information data is recorded, transmits a control signal to the signal processor circuit 11 to record a predetermined volume of predetermined dummy data, such as hexadecimal 00H into the recording area 2a of the optical disc 2 in order to perform finalization of the recording area 2c. Having recorded predetermined dummy data into the recording area 2c (refer to FIG. 2) to be finalized on the outer peripheral side of the optical disc 2 a predetermined distance away from the information data recording area 2a, the recording area 2c expected to become an unrecorded area after the information data is recorded, the microcomputer 13 transmits a control signal to the thread servo circuit 7, drives the thread motor 6 to move the optical pickup 3 to the recording area 2a of the optical disc 2 (refer to FIG. 2), and records the information data stored in the buffer memory 12 into the recording area 2a of the optical disc 2. Having recorded a predetermined volume of information data stored in the buffer memory into the recording area 2a of the optical disc 2, the microcomputer 13 transmits a control signal to the thread servo circuit 7, drives the thread motor 6 to move the optical pickup 3 to the recording area 2c (refer to FIG. 2) to be finalized on the outer peripheral side of the optical disc 2 a predetermined distance away from the information data recording area 2a of the optical disc 2, the recording area 2c expected to become an unrecorded area after the information data is recorded, and records a predetermined volume of dummy data into the area 2c of the optical disc 2 to be finalized in order to perform finalization. The microprocessor 13 then alternately repeats recording of information data into the area 2a of the optical disc 2 and finalization of the area 2c to be finalized on the outer peripheral side of the optical disc 2 a predetermined distance away from the information data recording area 2a of the optical disc 2, the area 2c expected to become an unrecorded area after the information data is recorded.

Having alternately repeated recording of information data into the area 2a of the optical disc 2 and finalization of the area 2c to be finalized on the outer peripheral side of the optical disc 2a predetermined distance away from the information data recording area 2a of the optical disc 2, the area 2c expected to become an unrecorded area after the information data is recorded, and with the recording of information data into the recording area 2a of the optical disc 2 complete and the information data recording area 2a (refer to FIG. 2) fixed, the microcomputer 13 transmits a control signal to the thread servo circuit 7, drives the thread motor 5 to move the optical pickup 3 to a remaining non-finalized area 2b (refer to FIG. 2) on the outer peripheral side of the recording area 2a of the optical disc 2 where information data is recorded, and records predetermined dummy data into the remaining non-finalized area 2b of the optical disc 2 thereby completing finalization of the optical disc 2. In this way, finalization of a recording area a predetermined distance away from the information data recording area of the optical disc, the first area expected to become an unrecorded area after the information data is recorded is performed in parallel with recording of the information data. After recording of the information data is complete and the information data recording area is fixed, finalization of the remaining non-finalized area is performed. This reduces the time required for finalization after information data is recorded.

Operation of the disc apparatus will be described referring to a flowchart of the operation of the disc apparatus according to the embodiment of the invention (FIG. 3).

When recording of information data whose recording time of timer-based preprogrammed recording or the like is known is instructed, execution proceeds from step S1 to step S2. In step S2, a recording area on the inner peripheral side of the optical disc for recording information data and an area on the outer peripheral side of the optical disc to be finalized that is expected to become an unrecorded area after the information data is recorded are calculated based on the information data recording time. Then execution proceeds to step S3.

In step S3, the optical pickup is moved to the information data recording area on the inner peripheral side of the optical disc and execution proceeds to step S4.

In step S4, information data stored in the buffer memory is recorded into the recording area on the inner peripheral side of the optical disc and execution proceeds to step S5.

In step S5, it is determined whether a predetermined volume of information data stored in the buffer memory is recorded into the recording area on the inner peripheral side of the optical disc is determined. In case a predetermined volume of information data is recorded, execution proceeds to step S6. Otherwise, execution returns to step S4 and steps from S4 are repeated.

In step S6, the optical pickup is moved to the area to be finalized on the outer peripheral side of the optical disc a predetermined distance away from the information data recording area of the optical disc and execution proceeds to step S7.

In step S7, predetermined dummy data is recorded into the area to be finalized on the outer peripheral side of the optical disc a predetermined distance away from the information data recording area of the optical disc in order to perform finalization and execution proceeds to step S8.

In step S8, it is determined whether a predetermined volume of predetermined dummy data is recorded into the area to be finalized on the outer peripheral side of the optical disc a predetermined distance away from the information data recording area of the optical disc. In case a predetermined volume of dummy data is recorded, execution proceeds to step S9. Otherwise, execution returns to step S7 and steps from S7 are repeated.

In step 9, it is determined whether recording of the information data onto the optical disc is complete. In case recording of the information data onto the optical disc is complete, execution proceeds to step S10. Otherwise, execution returns to step S3 and steps from S3 are repeated.

In step S10, the optical pickup is moved to a remaining non-finalized area on the outer peripheral side of the information data recording area of the optical disc 2, the non-finalized area fixed with recording of information data complete, and execution proceeds to step S11.

In step S11, predetermined dummy data is recorded into the remaining non-finalized area on the outer peripheral side of the information data recording area of the optical disc 2, the non-finalized area fixed with recording of information data complete to perform finalization, and execution proceeds to step S12.

In step S12, it is determined whether finalization of the remaining non-finalized area of the optical disc is complete. In case finalization of the remaining non-finalized area of the optical disc is complete, execution proceeds to step S13 to terminate the processing. Otherwise, execution returns to step S11 and steps from S11 are repeated.

While the embodiment for carrying out the invention has been described hereinabove, the invention is not limited thereto. The invention may be modified or improved within the general knowledge of those skilled in the art.

For example, the area to be finalized on the outer peripheral side a predetermined distance away from the recording area of the optical disc is finalized from the inner peripheral side in the embodiment, the area be finalized on the outer peripheral side a predetermined distance away from the recording area of the optical disc may be finalized from the outer peripheral side.

For example, in case that information data is too large to record the data in one optical disk, the optical apparatus may be configured such that a warding to replace the optical disk into recordable one is indicated when a finalization is over.

FIG. 1
5: SPINDLE SERVO CIRCUIT
7: THREAD SERVO CIRCUIT
8: TRACKING SERVO CIRCUIT
9: FOCUS SERVO CIRCUIT
10: TUNER
11: SIGNAL PROCESSOR CIRCUIT
12: BUFFER MEMORY
13: MICROCOMPUTER
14: CLOCK CIRCUIT
15: REMOTE CONTROL RECEIVER
FIG. 3
S1: START
S2: AN INFORMATION DATA RECORDING AREA AND AN AREA ON THE OUTER PERIPHERAL SIDE OF THE OPTICAL DISC TO BE FINALIZED THE INFORMATION DATA IS RECORDED ARE CALCULATED BASED ON THE INFORMATION DATA RECORDING TIME.

S3: THE OPTICAL PICKUP IS MOVED TO THE INFORMATION DATA RECORDING AREA.
S4: INFORMATION DATA STORED IN THE BUFFER MEMORY IS RECORDED INTO THE RECORDING AREA.
S5: PREDETERMINED VOLUME RECORDED?
S6: THE OPTICAL PICKUP IS MOVED TO THE AREA ON THE OUTER PERIPHERAL SIDE TO BE FINALIZED A PREDETERMINED DISTANCE AWAY FROM THE INFORMATION DATA RECORDING AREA
S7: PREDETERMINED DUMMY DATA IS RECORDED INTO THE AREA TO BE FINALIZED TO PERFORM FINALIZATION.
S8: PREDETERMINED VOLUME RECORDED?
S9: RECORDING OF INFORMATION DATA COMPLETE?
S10: THE OPTICAL PICKUP IS MOVED TO A REMAINING NON-FINALIZED AREA ON THE OUTER PERIPHERAL SIDE OF THE INFORMATION DATA RECORDING AREA.
S11: PREDETERMINED DUMMY DATA IS RECORDED INTO THE REMAINING NON-FINALIZED AREA TO PERFORM FINALIZATION.
S12: FINALIZATION COMPLETE?
S13: END

What is claimed is:

1. A disc apparatus for recording/reproducing information data onto/from a recording medium that requires finalization, the disc apparatus comprising:
   a calculation unit calculating, based on an information data recording time, a recording area for recording the information data and an area to be finalized that is expected to become an unrecorded area after the information data is recorded;
   a storage unit temporarily storing the information data;
   a recording unit recording the information data stored in the recording area calculated by the calculation unit;
   a first finalizing unit recording predetermined dummy data into an area to be finalized a predetermined distance away from the recording area calculated by the calculation unit to perform the finalization;
   a control unit alternately repeating a recording of a predetermined volume of information data by the recording unit and recording of a predetermined volume of the predetermined dummy data by the first finalizing unit; and
   a second finalizing unit recording the predetermined dummy data into a remaining non-finalized area of the recording medium to perform the finalization after recording of information data is over and the recording area of the information data is fixed.

2. A disc apparatus for recording/reproducing information data onto/from a recording medium that requires finalization, the disc apparatus comprising:
   a calculation unit calculating, based on an information data recording time, a recording area for recording the information data and an area to be finalized that is expected to become an unrecorded area after the information data is recorded;
   a storage unit temporarily storing the information data;
   a recording unit recording the information data stored in the information data recording area calculated by the calculation unit;
   a first finalizing unit recording predetermined dummy data into an area to be finalized a predetermined distance away from the recording area calculated by the calculation unit to perform the finalization;
   a control unit controlling recording of information data by the recording unit and recording of predetermined dummy data by the first finalizing unit; and
   a second finalizing unit recording the predetermined dummy data into a remaining non-finalized area of the recording medium to perform the finalization after recording of information data is over and the recording area of the information data is fixed.

3. A recording method for a disc apparatus for recording/reproducing information data onto/from a recording medium that requires finalization, the method comprising:
   calculating, based on the information data recording time, a recording area for recording information data and an area to be finalized that is expected to become an unrecorded area after the information data is recorded;
   recording a predetermined volume of information data into the calculated recording area;
   recording predetermined dummy data into an area a predetermined distance away from the calculated recording area to undergo finalization;
   alternately repeating, in case recording of the information data onto the recording medium is not over, a recording the predetermined volume of information data into the calculated recording area and a recording the predetermined dummy data into the area of predetermined distance away from the calculated recording area to undergo the finalization; and
   recording predetermined dummy data into a remaining non-finalized area on the outer peripheral side of the information data recording area fixed with recording of information data complete in order to perform finalization, in case recording of the information data onto the recording medium is over.

* * * * *